Figure 1:
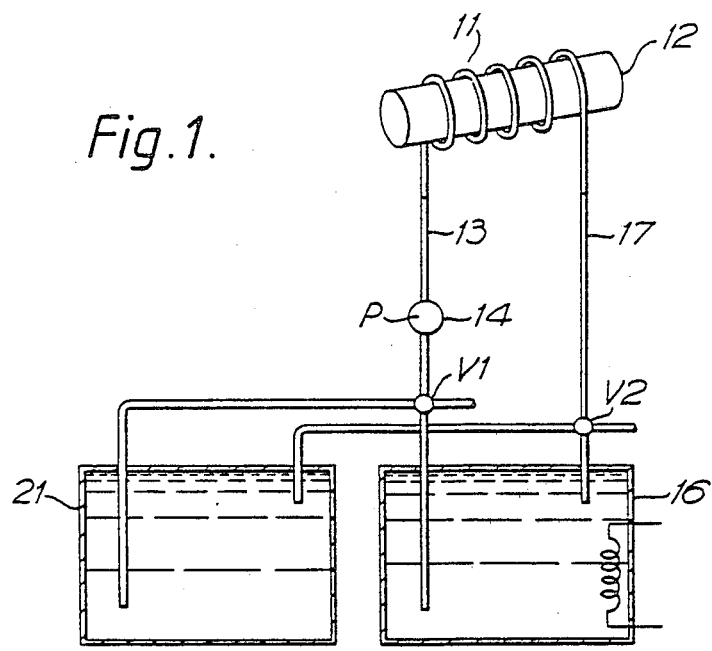

United States Patent [19]

Mitchell

[11] 4,422,999
[45] Dec. 27, 1983

[54] THERMOFORMING TUBULAR ARTICLES

[76] Inventor: Peter R. Mitchell, The Cottage, London Rd., Kingsworth, Winchester, Hampshire S023 7QN, England

[21] Appl. No.: 336,342
[22] PCT Filed: May 7, 1980
[86] PCT No.: PCT/GB80/00080
 § 371 Date: Dec. 31, 1981
 § 102(e) Date: Dec. 31, 1981
[87] PCT Pub. No.: WO81/03145
 PCT Pub. Date: Nov. 12, 1981
[51] Int. Cl.³ .............................................. B29C 17/02
[52] U.S. Cl. .................................... 264/339; 264/235; 264/285; 264/558
[58] Field of Search ............... 264/235, 285, 339, 346, 264/558, 570

[56] References Cited

U.S. PATENT DOCUMENTS

| | | | |
|---|---|---|---|
| 2,925,621 | 2/1960 | Parth | 264/188 |
| 3,340,344 | 7/1982 | Aston et al. | 264/570 |
| 3,352,960 | 11/1967 | McLaughlin | 264/339 |
| 3,560,295 | 2/1971 | Kimbrell et al. | 264/570 |
| 3,719,737 | 3/1973 | Vaillancourt et al. | 264/162 |
| 3,890,079 | 6/1975 | Slater | 425/155 |
| 4,039,641 | 8/1977 | Collins | 264/532 |
| 4,118,162 | 10/1978 | Baumgarten | 264/285 |
| 4,172,874 | 10/1979 | Castro, Jr. | 264/346 |

FOREIGN PATENT DOCUMENTS

| | | |
|---|---|---|
| 1120121 | 12/1961 | Fed. Rep. of Germany . |
| 1268815 | 3/1968 | Fed. Rep. of Germany . |
| 1268361 | 5/1968 | Fed. Rep. of Germany . |
| 1929459 | 12/1969 | Fed. Rep. of Germany . |
| 2355468 | 5/1974 | Fed. Rep. of Germany . |
| 2852061 | 7/1979 | Fed. Rep. of Germany . |
| 1173194 | 2/1959 | France . |
| 2342144 | 9/1977 | France . |
| 2362712 | 3/1978 | France . |
| 902745 | 8/1962 | United Kingdom . |
| 1126421 | 9/1968 | United Kingdom . |
| 1164936 | 9/1969 | United Kingdom . |

Primary Examiner—Donald E. Czaja
Assistant Examiner—W. Thompson
Attorney, Agent, or Firm—Cushman, Darby & Cushman

[57] ABSTRACT

Tubular thermoformed articles are manufactured from tubular blanks which are heated to the annealing temperature for a time sufficient to anneal the articles by flowing hot liquid therethrough whilst constrained in the desire shape or form followed by flowing cold liquid therethrough to cool to set before being released from the constraint.

2 Claims, 2 Drawing Figures

THERMOFORMING TUBULAR ARTICLES

The invention relates to thermoforming articles and is more particularly concerned with methods of manufacturing articles having a predetermined shape or form and manufactured from heat mouldable tubular material.

It is well known that thermoplastic tubular material can be bent with a bending die at suitable temperatures followed by cooling to set the material in the bent configuration. Such a process suffers the disadvantage that the finished articles are lacking in thermal stability, i.e. when the service conditions result in the article being reheated to temperatures approaching the temperature at which they were initially bent there is a tendency for articles to resume the original shape or form of the tubular material.

In general there have been two principal ways of manufacturing thermally stable predetermined shaped articles from tubular material that can be thermoformed. The first of these methods comprises injection moulding in which the article is formed in an openable mould. For a hollow article the mould comprises a casing and a core, the mould being designed so that the core can be removed from the moulded article. At some stage in such moulding, the mould is heated. In the other way of manufacture, the article is shaped from material while the material is in a plastic or pliable state and then the shaped article is baked or at least heated in an autoclave or oven.

Each of the above principal ways of manufacture have substantial disadvantages. Thus, the cost of injection moulding apparatus is sufficiently high to justify such expenditure only when very large numbers of articles are to be manufactured. Further it is really only economical and practical to mould relatively small articles. This is equally relevant to a manufacturer using an autoclave since the cost of a large volume autoclave can only be justified either for large production volumes or for high value large articles.

Neither of the conventional manufactures is particularly suitable for low volume production of relatively large awkward shaped articles. The present invention addresses this difficulty.

According to the present invention there is provided a method of annealing tubular articles of heat mouldable material comprising heating the articles to the annealing temperature for a time to effect the annealing thereof and cooling the articles to set by passing a fluid therethrough while the articles are restrained in the predetermined shape or form.

On releasing the constraint on the finished article it remains in the predetermined shape or form and exhibits a high degree of thermal stability.

The invention also provides a method of manufacturing an article having a predetermined shape or form from a tube of heat mouldable material comprising bending the tube to the predetermined shape, heating the tube to the annealing temperature of the material by passing heated fluid through the tube, maintaining the flow of heated fluid for a period of time sufficient to anneal the tube and cooling the tube while still constrained in the bent shape.

Preferably the tube is cooled by flowing cooling fluid through the tube after the flow of heating fluid is terminated. Preferably both fluids are the same substance.

When the tube is not sufficiently flexible at ambient temperature to be readily bent to the predetermined shape or form a heated fluid can be flowed through the tube to heat the tube before bending to a temperature at which the tube is flexible enough to be fitted to a jig structure defining the predetermined shape or form. The fluid which is flowed through the tube must have a boiling point higher than the desired process temperature and can conveniently be oil.

Suitable heat mouldable or thermoformable materials are polyethylene, vinyl polymers such as polyvinyl chloride, polyvinyl acetate or polyamides.

The tubular blank can, for example, comprise a tube and can be shaped either by winding it onto a former to form a coil or by threading it onto or fixing it to a jig or like support structure.

Figure 2:
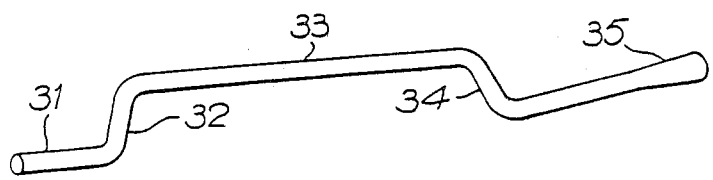

Two examples of ways of performing the invention will now be described with reference to the accompanying drawings, in which:

FIG. 1 is a diagrammatic drawing of apparatus for carrying out a first embodiment of the invention; and FIG. 2 is a diagrammatic drawing of an article manufactured in a second embodiment.

The manufacture to be described with reference to FIG. 1 is usable to form a coil of tubular plastics material which coils are usable for coupling vacuum from a motor tractor to its trailer.

The initial tube is straight and flexible and is wound into a coil 11 on a rigid, in this example wooden, cylindrical former 12. The tube is formed of nylon hose, having an internal diameter of about 1 cm and a wall thickness of about 0.1 cms. The former is about 12 to 15 cms. in diameter and about 60–75 cms long. The former is detachably and rotatably mounted in a suitable frame (not shown). The tube is wound as a coil onto the former either while the former is detached from its mounting frame or by rotating the former in its frame and feeding the tube onto the rotating former. The former may be helically grooved to receive the tube. The rigidity of the wall of the tube is such that the bore remains substantially constant and the tube does not flatten.

When the coil has been wound on the former it is connected by a feed conduit 13 to a liquid pump 14 connected via a three-way valve V1 to a hot oil reservoir 16. The oil in the reservoir is Shell Clavus 25. An immersion heater is used in this example to heat the oil to a temperature of 150° C. Oil is returned to the reservoir 16 by a return conduit 17 including a second three-way valve V2. A second inlet of the supply valve V1 is connected to the outlet of a cold oil reservoir 21 and a second outlet of the return valve V2 is connected to the inlet of the reservoir 21. The cold oil is at room temperature but can be cooled to a lower temperature.

After winding the coil and connecting up the conduits, the pump is switched on and hot oil flowed through the coil. The flow is maintained for about four minutes with the reservoir oil temperature at about 150° C. The valves V1 and V2 are then adjusted to change the oil flow from hot oil to cold oil. The cold oil is allowed to flow for about four minutes. The oil is then vented from the coil by setting the valve 14 to its third setting in which air is pumped into the coil. Finally, and if required, the oil in the coil can be scavenged, for example by admitting a blast of nitrogen from a high pressure source into the coil.

After cooling, and scavenging if desired, the former is removed from its mounting frame and taken out from the coil. The coil retains its helical form. The helical coil can be extended and compressed in the manner of a concertina. Suitable fittings can be swaged or otherwise secured to the ends of the coil tube to permit it to be connected in a fluid or vacuum circuit. The coil is thermally stable.

In the second embodiment the article is of relatively large size. The article is usable, for example, in the air conditioning system of a vehicle and replaces a similar product which has hitherto often been assembled from discrete parts, at least some of which were metal. The article is formed from what is commercially identified as "high pressure nylon hose". Such hose is flexible in that it can be wound into relatively large diameter coils of, say for a 1.25 cm bore hose, 75–100 cms diameter. However, when cold or at room temperature, the hose cannot be taken around small radius curves e.g. curves of say 5 to 10 cms radius.

As illustrated in FIG. 2, the article comprises five consecutive sections 31 to 35 and is between 1½ and 2 meters in length. The sections are not all in the same plane and, in fact, in this example only sections 31, 32 are in the same plane. The article is formed using a jig structure which provides a grooved path into which the hose can be fitted. This is done by first laying out the hose alongside the jig path and then flowing oil at a temperature of 100° C. through the hose for two minutes. By this time the hose has reached a temperature at which the nylon wall is sufficiently flexible to permit the tube to be fitted into and secured in the jig path. The oil temperature is then raised to between 150° C. and 170° C. and caused to flow for a further four minutes. The hose is connected in an oil flow circuit similar to that illustrated in FIG. 1. Thereafter, the oil flow is changed from hot oil to cold (room temperature) oil to cool the hose to set and then vented and, if required, scavenged.

Many changes may be made to the two ways hereinbefore described of performing the invention. For example, a fluid other than oil, eg a gas or water, may be passed through the tubular material. The article can be moulded to have substantially any reasonable, required shape or form. The two described articles retain the full bore through their length since collapse of the tube is prevented by the internal liquid pressure. However, if it is required to introduce a constriction this can be done when the tube is heated after bending. Again, if an exterior fixing flat is required this can be moulded into the tube wall. In both the examples the ambient medium was atmospheric air. However there could be circumstances where a different medium, for example a liquid, is required.

I claim:

1. A method of manufacturing an open ended tubular article of predetermined shape or form from a tube of heat mouldable plastics material comprising preheating a tube to a forming temperature at which it can be bent to a predetermined shape by passing a heated fluid therethrough, bending the tube to the predetermined shape, heating the tube above the temperature at which it is bent to the annealing temperature of the material by passing heated fluid therethrough in direct contact with the interior of the tube, maintaining the flow of heated fluid for a period of time sufficient to anneal the tube and cooling the tube while constrained in the predetermined shape by passing a cooling fluid therethrough, the heating and cooling fluids comprising the same substance.

2. A method according to claim 1 in which the tube is high pressure nylon hose which is preheated by passing oil at 100° C. therethrough for a period of two minutes prior to bending, and annealed by passing oil at a temperature of between 150° C. and 170° C. therethrough for a period of four minutes after bending.

* * * * *